(12) United States Patent
Szabo et al.

(10) Patent No.: US 9,870,502 B2
(45) Date of Patent: Jan. 16, 2018

(54) APPARATUS FOR, A METHOD OF, AND A NETWORK SERVER FOR DETECTING DATA PATTERNS IN A DATA STREAM

(71) Applicant: Telefonaktiebolaget L M Ericsson (publ), Stockholm (SE)

(72) Inventors: Geza Szabo, Kecskemet (HU); Rafael Antonello, Recife (BR); Stenio Fernandes, Recife (BR); Djamel Sadok, Jaboatão dos Guararapes (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 340 days.

(21) Appl. No.: 14/431,826

(22) PCT Filed: Sep. 28, 2012

(86) PCT No.: PCT/EP2012/069198
§ 371 (c)(1),
(2) Date: Mar. 27, 2015

(87) PCT Pub. No.: WO2014/048488
PCT Pub. Date: Apr. 3, 2014

(65) Prior Publication Data
US 2015/0262009 A1    Sep. 17, 2015

(51) Int. Cl.
*G06K 9/00*      (2006.01)
*H04L 12/26*    (2006.01)
(Continued)

(52) U.S. Cl.
CPC ..... *G06K 9/00523* (2013.01); *G06F 17/3051* (2013.01); *G06F 17/30985* (2013.01);
(Continued)

(58) Field of Classification Search
CPC ............ G06K 9/00523; G06K 9/00979; G06F 17/3051; G06F 17/30985; H04L 43/50; H04L 63/1416; H04L 69/22
See application file for complete search history.

(56) References Cited

U.S. PATENT DOCUMENTS 6,839,751 B1 *  1/2005  Dietz ...................... H04L 47/34
                                                                      709/223
7,991,723 B1     8/2011  Dubrovsky et al.
(Continued)

FOREIGN PATENT DOCUMENTS

EP    1983717 A1    10/2008
EP    1986390 A2    10/2008
(Continued)

OTHER PUBLICATIONS

Becchi et al., "A Hybrid Finite Automaton for Practical Deep Packet Inspection", ACM CoNEXT 2007, New York, New York, USA, Dec. 10-13, 2007, 1-12.
(Continued)

*Primary Examiner* — Patrice Winder
(74) *Attorney, Agent, or Firm* — Murphy, Bilak & Homiller, PLLC (57) ABSTRACT

An apparatus (30), method, network server (42, 43, 44, 46, 48) and system (40) for detecting data patterns in a data stream (37) comprising a plurality of data symbols representing characters of an alphabet, said apparatus (30) executing a deterministic finite automata. The apparatus comprises a state transition register (31) comprising a plurality of states (11, 12, 13, 14, 15) including a start state (11) and at least one accepting state (14), and state transitions (16a, 16b, 16c) from an initial state to a destination state triggered by a data symbol of the data stream (37). The apparatus (30) further comprises character position determining means (32) for determining for each data symbol of each state of the state
(Continued)

transition register (31) a corresponding character position in the alphabet, it further comprises updating means (33) for updating the state transition register (31) to comprise data symbol ranges (18x, 18y) for data symbols with corresponding subsequent character positions (18b) in the alphabet triggering transitions to a same destination state. The apparatus (30) also comprises range determining means (34) for determining whether a data symbol of the data stream (37) is comprised in a data symbol range (18x, 18y) of the updated state transition register (37), and determining the corresponding destination state (18b) thereof, and triggering means (35) for triggering a state transition (16a, 16b, 16c) from the initial state to the determined destination state for detecting the data pattern.

10 Claims, 3 Drawing Sheets (51) Int. Cl.
H04L 29/06 (2006.01)
G06F 17/30 (2006.01)

(52) U.S. Cl.
CPC .......... *G06K 9/00979* (2013.01); *H04L 43/50* (2013.01); *H04L 63/1416* (2013.01); *H04L 69/22* (2013.01)

(56) References Cited

U.S. PATENT DOCUMENTS

| | | | |
|---|---|---|---|
| 2003/0149562 A1* | 8/2003 | Walther | G06F 17/2863 704/243 |
| 2005/0012521 A1* | 1/2005 | Sharangpani | G06F 17/30985 326/46 |
| 2005/0273450 A1 | 12/2005 | McMillen et al. | |
| 2006/0085389 A1* | 4/2006 | Flanagan | G06F 17/30985 |
| 2006/0120137 A1 | 6/2006 | Gould et al. | |
| 2008/0046423 A1 | 2/2008 | Khan Alicherry et al. | |
| 2008/0270764 A1 | 10/2008 | McMillen et al. | |
| 2009/0106183 A1 | 4/2009 | Estan et al. | |
| 2010/0174770 A1 | 7/2010 | Pandya | |
| 2010/0293196 A1* | 11/2010 | Roy | G06F 17/30548 707/776 |
| 2011/0167030 A1* | 7/2011 | Bremler-Barr | G06N 5/003 706/48 |
| 2011/0258210 A1* | 10/2011 | Agarwal | G06F 17/30985 707/758 |
| 2012/0130932 A1* | 5/2012 | Veanes | G06F 11/3684 706/46 |

FOREIGN PATENT DOCUMENTS

| | | |
|---|---|---|
| JP | H04223566 A | 8/1992 |
| JP | H04348472 A | 12/1992 |
| JP | 4565064 B2 | 8/2010 |
| RU | 2117388 C1 | 8/1998 |
| WO | 03023553 A2 | 3/2003 |
| WO | 2007064685 A2 | 6/2007 |
| WO | 2008053762 A1 | 5/2008 |

OTHER PUBLICATIONS

Becchi et al, "An Improved Algorithm to Accelerate Regular Expression Evaluation", In Proceedings of the 3rd ACM/IEEE Symposium on Architecture for Networking and Communications Systems, Orlando, Florida, USA, Dec. 3-4, 2007, 145-154.

Choi et al., "Content-aware Internet Application Traffic Measurement and Analysis", 2004 IEEE, Network Operations and Management Symposium, 2004, 511-524.

Dreger, et al., "Dynamic Application-Layer Protocol Analysis for Network Intrusion Detection", USENIX Association, Security '06: 15th USENIX Security Symposium, 2006, 257-272.

Ficara, et al., "An Improved DFA for Fast Regular Expression Matching", ACM SIGCOMM Computer Communication Review, vol. 38, No. 5, Oct. 2008, 31-40.

Jiang, et al., "A FPGA-based Parallel Architecture for Scalable High-Speed Packet Classification", Application-specific Systems, Architectures and Processors, 2009, 1-8.

Karagiannis, et al., "Is P2P Dying or Just Hiding?", 2004 IEEE Globecom, 2004, 1-7.

Kim et al., "Internet Traffic Classification Demystified: Myths, Caveats, and the Best Practices", ACM CoNEXT 2008, Madrid, Spain, Dec. 10-12, 2008, 1-12.

Kumar et al., "Advanced Algorithms for Fast and Scalable Deep Packet Inspection", ANCS'06, San Jose, California, USA, Dec. 3-5, 2006, 81-92.

Kumar et al., "Algorithms to Accelerate Multiple Regular Expressions Matching for Deep Packet Inspection", Proceedings of the 2006 Conference on Applications, Technologies, Architectures, and Protocols for Computer Communications, SIGCOMM'06, Pisa, Italy, Sep. 11-15, 2006, 339-350.

Moore et al., "Toward the Accurate Identification of Network Applications", 2005 Proceedings of the Passive & Active Measurement Workshop, 2005, 41-54.

Smith et al., "Deflating the Big Bang: Fast and Scalable Deep Packet Inspection with Extended Finite Automata", SIGCOMM'08, Seattle, Washington, USA, Aug. 17-22, 2008, 1-12.

Unknown, Author, "The Dot Language", Available on-line at http://www.graphviz.org/doc/info/lang.html; retrieved on Mar. 5, 2015, 1-4.

Yu et al., "Fast and Memory-Efficient Regular Expression Matching for Deep Packet Inspection", Proceedings of the 2006 ACM/IEEE Symposium on Architecture for Networking and Communications Systems, ANCS'06, San Jose, California, USA, Dec. 3-5, 2006, 1-10.

Yu et al., "Gigabit Rate Packet Pattern-Matching Using TCAM", Proceedings of the 12th IEEE International Conference on Network Protocols (ICNP'04), Oct. 5-8, 2004, 1-10.

* cited by examiner

APPARATUS FOR, A METHOD OF, AND A NETWORK SERVER FOR DETECTING DATA PATTERNS IN A DATA STREAM

TECHNICAL FIELD

The present invention relates to data processing and, in particular to an apparatus and a computer controlled method for data pattern detection in a data stream with a deterministic finite automata.

BACKGROUND

The amount of data transmitted over telecommunications networks increases rapidly. High speed and high capacity packet data networks and servers are employed for transferring these data. Amongst others for test and monitoring purposes, to guarantee a desired or agreed Quality of Service, QoS, for example, packet header information on, for example, source and destination addresses is not sufficient to obtain the required information. In some cases the payload of data packets needs to be inspected for particular data patterns, for example. Data mining, detection of data viruses and other malicious data are further examples that may require packet data inspection.

A method of inspecting packets is by employing finite automata, such as disclosed in US 2008/270764 A1 and EP 1 986 390 A2. A finite automata, or simply a state machine, is a computer controlled method that is employed as an abstract state machine operating on states according to a state transition table or state transition register. Such state transition table comprises—for a plurality of states of the finite automata—a transition from a present, initial state to a next, destination state upon inputting a particular data symbol in the present state, eventually leading to a data pattern match of a particular string of input data symbols. Such data symbols are, for example, the data symbols comprised in an alphabet such as the well-known computer alphabet American Standard Code for Information Interchange, or in short ASCII. As such, a state transition to a subsequent, destination state may also involve a transition to the same state of the automata, called a non-forwarding transition. In such a case, the state transition is a transition wherein the initial state equals the destination state, e.g., a non-forwarding loop to the same state.

In general, two types of finite automata can be distinguished. Deterministic Finite Automata, DFA, and Non-deterministic Finite Automata, NFA. DFA is preferred at processing speed, as it requires only constant amount of memory accesses while parsing thru the packet payload. The cost of such computation efficiency is the high memory storage as the number of states and state transitions exponentially increases memory footprint. NFA has lower memory storage requirements but as from every state the next state can be several others in parallel, it requires a lot of computation resources to check every possible case.

Both DFA and NFA have their own strengths and weaknesses and can be employed in software tools for data packet inspection systems.

As the amount of data transmitted over telecommunications networks increases rapidly, network servers employing a finite automata may require a too high amount of resources, i.e. memory storage and memory access controllers, generally designated as memory footprint. Accordingly, there is a need for an improved method of detecting data patterns by executing finite automata.

SUMMARY

It is an object of the present invention to provide an improved apparatus and method for detecting data patterns in a data stream.

It is, in particular, an object of the present invention to provide an apparatus and computer controlled method for detecting data patterns arranged for executing a deterministic finite automata on high-speed data streams.

In a first aspect an apparatus for detecting data patterns in a data stream is provided comprising a plurality of data symbols representing characters of an alphabet. The apparatus executes a deterministic finite automata and comprises the following. A state transition register comprising a plurality of states including a start state and at least one accepting state, and state transitions from an initial state to a destination state triggered by a data symbol of the data stream. It further comprises character position determining means for determining for each data symbol of each state of the state transition register a corresponding character position in the alphabet, updating means for updating the state transition register to comprise data symbol ranges for data symbols with corresponding subsequent character positions in the alphabet triggering transitions to a same destination state. Further it comprises range determining means for determining whether a data symbol of the data stream is comprised in a data symbol range of the updated state transition register, and determining the corresponding destination state thereof, and triggering means for triggering a state transition from the initial state to the determined destination state for detecting the data pattern.

For processing a data stream with an apparatus to detect data patterns the apparatus is arranged to compare the data symbols comprised in the data stream with data symbols stored in the state transition table. At the beginning, the finite automata is at its first state, i.e. the start state. For the start state and for each further state of the finite automata, the state transition table comprises information on state transitions. This means, that for each state, a combination of destination states and corresponding data symbols is comprised in the register. The data symbol of the data stream processed, e.g. parsed, and at that moment compared with the data symbols stored in the state transition register. The matching data symbol of the register comprises a corresponding destination state, and as such a transition is triggered to that destination state. From thereon the process is repeated, and the next data symbol of the data stream is processed, e.g. compared with the state transition register.

If the data symbols of the data stream are comprised in a computer alphabet such as the extended ASCII alphabet, each data symbol can be one of the 256 different possible characters. As such, the state transition table stored in the memory contains destination states for all of these 256 characters, for each state of the finite automata. A state transition register for detecting for example a relative short, simple 5 character ASCII string holds information on 5×256=1280 state transitions. One can imagine that for detecting extensive strings and large numbers of strings, memory requirements rapidly increase.

According to an aspect of the invention an alternative way of storing information in the state transition register with lower memory resource requirements was found. The state transitions stored in the state transition register often comprise plural transitions to the same destination state. As such at least part of the information stored in the register is susceptible for compression.

The data symbols of the data stream, and as such the data symbols stored in the state transition table are represented as characters of, for example, an (extended) ASCII alphabet. Within the alphabet each character has a subsequent number, e.g. data symbol "A" is a representation of the 65th ASCII character code, and data symbol "B" a representation of the 66th ACSII character code. The inventors used the inside that storage of data symbols in the state transition table can be compressed if use is made of a range of data symbols as a representation of the plurality of single data symbols since there are most often less destination states than character possibilities. As such, those data symbols with subsequent character positions in the alphabet that have the same corresponding destination state can be grouped into a single representation.

Since the characters have fixed subsequent positions within an alphabet ranges of characters can be grouped that trigger the same destination state.

The apparatus according to a first aspect of the present invention comprises means for determining the character position of all data symbols comprised in the state transition register. Per state of the state transition register all records are checked to determine which series of data symbols refer to subsequent character positions that have the same corresponding destination state. If for example the data symbols "A", "B", "C", "D" and "E" of for example state 1 trigger a transition to destination state 2, these symbols can be grouped and represented with a smaller memory footprint. The data symbols represent character positions 65 through 69 and for example a single data symbol range can be indicative for all symbols comprised therein. The state transition register can be updated with these less memory intensive referrals and as such reduction of memory resources is achieved by the apparatus.

Upon executing the compressed, e.g. updated state transition table, the apparatus comprises means for determining whether a data symbol of the data stream is comprised in a data symbol range of the updated state transition register, and subsequently determines the corresponding destination state thereof. With triggering means the apparatus executes the finite automata according to the destination state and triggers the transition thereto. As such the finite automata is executed to detect data patterns according to the state transition register in the data stream.

In a further example the means for determining are arranged to sort for each state of the state transition register all data symbols according to the corresponding character position in the alphabet.

Since data symbols can be represented as characters of an alphabet, they have defined character positions within the alphabet. For updating the state transition register to comprise data symbol ranges as a representation for data symbols with subsequent character positions it is advantageous to first sort the data symbols according to their relative position within the alphabet. This increases processing since the apparatus can more easily determine which state transitions can be grouped if the state transitions, i.e. the sets of data symbols with corresponding destination states, are sorted according to their character position or character code representation according to the alphabet.

In another example the alphabet comprises a computer alphabet, and in particular an ASCII or extended ASCII alphabet.

The alphabet can be any alphabet to be processed by the apparatus, i.e. the computer performing a computer implemented method of detecting data patterns. Amongst other the alphabet can be any alphabet readable by humans, such as Latin or Greek alphabets. Within human readable alphabets the data symbols, e.g. the characters, are often associated according to a standard ordering of the symbols, also known as an alphabetical order as a method of collation.

The alphabet can also be a computer or mathematical alphabet, meaning the characters are ordered according to a character encoding, i.e. according to an ASCIIbetical order, or lexicographical order. For example the character encoding ASCII and extended ASCII are often used in communication network. More modern encoding types can also be used such as encoding according to the ISO/IEC 10646 Universal Character Set and Unicode or more specific, ISO/IEC 8859-1 through 16 or UTF-8 or UTF-16.

In a further example the data symbols represent characters of an ASCII alphabet, and in particular an extended ASCII alphabet, and wherein the character positions represents binary, octal, decimal, or hexadecimal codes of the ASCII characters. According to the encoding of the alphabet, e.g. according to the alphabetical order, use can be made of their respective binary, octal, decimal or hexadecimal code representation.

In another example the apparatus is arranged to perform the determining of the character positions and updating the state transition table independent of the determining of the data symbol in a data symbol range and the triggering of the state transition.

In the first example the apparatus is arranged to read a state transition register comprising the state transition according to which the finite automata is executed. The state transition table is updated to comprise data symbol ranged in order to lower its memory footprint. Further, the apparatus executes the finite automata according to the updated/compressed state transition register. The outcome of the finite automata, e.g. whether or not a data pattern is a matched, is the same if executed according to the initial state transition register as when executed according to the updated state transition table.

Once updated, the state transition table can be re-used in further finite automata executions. Accordingly, the or any apparatus can be arranged to update the state transition register to comprise data symbol ranges, and at a different moment, or with a different apparatus the updated state transition register can be used to detect data patterns. As such, if implemented in a single apparatus, the apparatus is arranged to perform both the finite automata with a compressed state transition table register comprising ranged data symbols as well as updating the state transition register to comprise these ranged data symbols. If the apparatus executes a further finite automata comprised by the same state transition register it can re-use the updated state transition register in stead of performing the update step.

In yet a further example the apparatus is arranged to finalize the detection of the data pattern upon a state transition being triggered to an accepting state of the deterministic finite automata.

Standard automata theory prescribes that all data symbols are processed before the result is given on a match on the detected pattern or not. This means that, even though the automata reaches a state from which it can never result in an accepting state, all input data symbols of the data stream need to be processed. This has a major impact on parsing speed of the automata.

According to some applications the apparatus is arranged to operate according to standard automata theory. However, if some formal requirements thereof are relaxed, a higher compression on the state transition register can be achieved. For example, in the domain of packet inspection there is often no need to report all instance of a pattern match on the input data symbol stream. The first match, i.e. the first state to be reached by the finite automata which is an accepting state, can be sufficient to end the finite automata and report its result.

Consequently, by implementing a return function, wherein the detection is finalized i.e. the finite automata is returned to its start state, further state transitions can be removed from the state transition register. Advantageously, this results in further compression and as such, further lowered memory footprint.

In another example the data stream is processed, by the computer, in accordance with the detected data pattern. The computer performing the method can be employed for plural services. For example, to filter traffic in a gateway setting. As such, the computer can detect unwanted traffic in the data stream. The data stream is received by the computer and matched according to data patterns. If a pattern is matched, and as such, unwanted traffic is detected, the computer can perform a further action on the data stream. Depending on the patterns the proper action can be performed. For example, data matching on unwanted protocols or viruses, can be dropped or rerouted.

In a second example a computer controlled method is presented of detecting data patterns in a data stream received by the computer, the data stream comprising a plurality of data symbols representing characters of an alphabet, the computer executing a deterministic finite automata comprising a compressed state transition register comprising a plurality of states including a start state and at least one accepting state, and state transitions from an initial state to a destination state triggered by a data symbol of the data stream, wherein the compressed state transition register comprises at least data symbol range, the method comprising the steps of:
  determining, by the computer, from the compressed state transitions register, whether a data symbol of the data stream is comprised in a data symbol range of the compressed state transition register, and determining the corresponding destination state thereof, and
  triggering, by the computer, a state transition from the initial state to the determined destination state for detecting the data pattern.

With the method according to the above described steps data patterns can be detected in a data stream received by the computer performing the method. According to automata theory a state transition register is present in the computer, however, according to an aspect of the invention the register is a compressed state transition register wherein at least one set of data symbols is represented by a data symbol range. The method comprises the step of performing a lookup process for determining the next destination state of the automata according to the data symbol of the data stream processed at that moment. According to automata theory, the data symbol is compared for a matching data symbol in the state transition register. The corresponding destination state is the state to which the finite automata will be triggered.

However, according to the second example, the automata theory is implemented according to a determination step wherein for the data symbol of the input data stream it is determined to which group it belongs. This means, if it is represented by a data symbol range, to determine its corresponding destination state. If not represented by a data symbol range, to determine, according to standard automata theory, is destination state. Then in a further step the transition to the destination state is triggered accordingly.

In a third example a computer controlled method is presented of generating a compressed state transition register according to the description above, comprising the steps of:
  determining, by the computer, for each data symbol of each state of a state transition register a corresponding character position in the alphabet; and
  updating, by the computer, the state transition register to comprise data symbol ranges for data symbols with corresponding subsequent character positions in the alphabet triggering transitions to a same destination state.

Once the state transition register is updated it can be used as replacement for the original state transition register for executing the finite automata to detect data patterns therewith. As such, the method steps of updating can be performed by a same computer as the method steps of performing the finite automata with the updated register. However, they can also be performed separately by different computers. A first computer for example can be arranged to compress state transition registers, i.e. parsing a single or plurality of state transition registers of a library, and a second computer to execute a finite automata according to a single or plurality of updated/compressed register or registers of a library.

As such, performing a computer controlled method of determining the character position of the data symbol in the alphabet, e.g. determining is alphabetical order, and updating the state transition register to comprise symbol ranges for those data symbols with corresponding subsequent character positions in the alphabet triggering a transition to the same destination state, has the advantage that it can be performed independent of the execution of the finite automata.

In a further example the method further comprises the step of sorting, by the computer, for each state of the state transition register all data symbols according to the corresponding character position in the alphabet.

The data symbols of the data stream can be represented in the form of characters of an alphabet. As such they have specific positions within the alphabet. Updating the state transition register to comprise data symbol ranges can be performed according to these positions. Sorting the data symbols according to their position in the alphabet, e.g. alphabetized or placed in the alphabetical order, has the advantage that parsing speed of the register is increased since groups of state transition can be formed, e.g. data symbol ranges, for non-changing destination states of subsequent data symbols of the register.

In yet another example the method further comprises the step of removing from the state transition table, each state transition for a state wherein for all corresponding state transitions the initial state is equal to the destination state.

As described, non-compressed state transition registers comprise data symbols and corresponding destination states for each state of the finite automata.

Compressed state transition registers according to an example of the invention also comprise at least one data symbol range. For some states the respective state transitions do not comprise any transition to a further state. This means that the finite automata has entered a dead track and as such will continue to stay in that state, or trigger on each data symbol a transition to the same state also known as a non-forwarding transition. Since this information contained in the state transition register will not contribute to the detection of the data pattern, it is advantageous to remove such information. As such, all further state transitions can be removed from the register from which the finite automata can not trigger a transition to a different state, and as such wherein the destination state is the initial state.

In another example the method further comprises the step of removing from the state transition table, each state transition for a state wherein no corresponding state transition can result in an accepting state.

Further to removing state transitions for non-forwarding states, the states subsequent to these states can also be removed from the state transition table. Further, those state transitions can also be removed wherein non on the subsequent states of that track of the finite automata comprises an accepting state. This means that in an example of detecting a data pattern the finite automata could enter a particular state from which all direct destination states for which the current state is the source state, and for all further destination states thereof none of them is an accepting state. Accordingly there is no chance of matching on a data pattern and thereof it is advantageous to remove the corresponding information, i.e. the data symbols and destination states of those states, from the state transition register for achieving further compression thereof.

In a further example the method further comprises the step of removing from the state transition table, each state transition wherein the initial state is a final state. For some applications a first hit of the finite automata is sufficient, e.g. a match on a data pattern is presented when a first accepting state is entered. For those applications the state transition register can be comprises even further by removing all subsequent state transitions thereof since, for those applications, this does not add required information on the detected patterns.

In a fourth example a computer program product is presented comprising a data storage device storing computer program code data arranged for performing the method according to any of the above described features, when the program code data are loaded into a memory of an electronic processing unit and are executed by the electronic processing unit.

In a fifth example a telecommunications network is presented that comprises a network server according to the description above.

BRIEF DESCRIPTION OF THE DRAWINGS

The present invention will be further discussed in more detail below, using a number exemplary embodiments, with reference to the attached drawing, in which.

DETAILED DESCRIPTION

Figure 1:
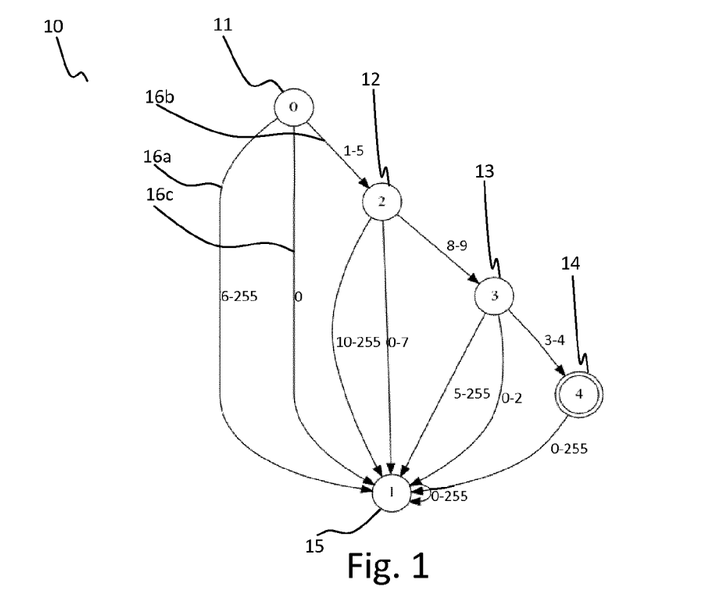
FIG. 1 illustrates a simplified finite automata comprising five states and state transitions between the states.

In FIG. 1 an example of a representation of a finite automata 10 is disclosed. Finite automata can be used to identify data patterns in data streams, i.e. data traffic in telecommunications networks. Such identification can, for example, be applied in virus or spyware detection, intrusion detection systems, content filtering, protocol matching etc.

The finite automata 10 shown in FIG. 1 comprises a plurality of states 11, 12, 13, 14, 15. These states may also be referred to as nodes. The data pattern matching process starts with the start state 11 of the finite automata 10. A start state can be defined as a state for which no entry action is present, i.e. for which there is no transition resulting in that state. In FIG. 1 state 11 is such a start state.

A data stream processed by the computer comprises a sequence of data symbols. These data symbols, or characters, are received by the computer and are used one at a time as input to the current state of the finite automata 10 for triggering a state transition 16a, 16b, 16c. Upon the start of the pattern matching process the start state 11 is the current state or initial state. The first data symbol of the data stream determines the state transition 16. If for example the first data symbol refers to character 0 of the ASCII table, i.e. character code 0, a state transition 16c is triggered from start state, state zero, 11 to the first state 15. However, if the first data symbol refers to character (code) 1, a state transition 16b is triggered to the second state 12. After the first state transition 16b, 16b, the state to which the transition is triggered, i.e. state 12 or 15, is at that time the current state.

Then again, for the current state, i.e. state 12, the next data symbol of the data stream is used to determine the next state transition. If the next data symbol is character code 5 a state transition is triggered to the first state 15, the same accounts for all characters in the range of 0-7 and all characters in the range 10-255. However, if the next data symbol in the data stream is character 8 or 9, a state transition is triggered to the third state 13. Then for the third data symbol a state transition is triggered to the first state for all characters 0-2 and 5-255. However, if the third data symbol is character 3 or 4, the fourth state 14 is entered. This is an accepting state, or final state and represented by a double circle.

When an accepting state is reached, the finite automata gives a match on a data pattern according to the finite automata. In this example, this is a match on the regular expression {[1-5],[8-9],[3-4]}, being any of the characters 1-5 for the first data symbol, then either character 8 or 9 for the second data symbol and finally character 3 or 4 for the third data symbol.

Plural finite automata can exist, giving rise to a plurality of data patterns for determining a plurality of protocols, data strings, viruses etc. The finite automata disclosed in FIG. 1 is a simplified version of a finite automata as there are only a certain amount of transitions and states shown. Actually, a complete finite automata displays a state transition for every possible input data symbol. Therefor, for 256 possible data symbols of the ASCII character alphabet, every state of the finite automata has 256 state transitions. However, most state transitions trigger a transition to a same subsequent state and can therefor visually be represented as a single range. In the example of FIG. 1 the state transition for state zero 11 to the first state 15 is comprised of 2 state transitions, one single state transition for character 0 and a ranged state transition for all characters in the range 6 to 255.

The graph displayed in FIG. 1 is a finite automata in the form of a state diagram, but it is only an example of a representation. Other types of representations exist. A prior art finite automata are stored in a computer in a more formal manner. The state diagram displayed in FIG. 1 displays only a limited amount of state transition for each state. A prior art state transition table, being an implementation of a stored finite automata in a computer, holds records for all possible state transitions for each state. As displaying such a register with a state diagram would be unclear, state diagrams can be simplified representations of the state transition register. State transition registers however are more formal and functional way to comprise the same regular expression as by a visualisation shown in FIG. 1. State transition registers are like truth tables defining the output for a state upon a certain input.

The data symbols of the date stream that is being processed by the computer implementing the finite automata, are represented as characters. These characters can be well known characters such as "1", "α", and "β", however they can also be computer characters such as ">" "-" or "¬". These characters form part of an alphabet which comprises a standard, fixed set of data symbols. Plural alphabets exists, well known human readable, natural alphabets such as the Arabic, Syriac, Cyrillic, Greek, Hebrew, and Latin alphabet. However, also computer alphabets can be considered alphabets and they can comprise more that letters, including numerical digits, common punctuation marks and control characters which do not correspond to symbols in a particular natural language.

As such, according to the invention an alphabet is to be considered a set of symbols in its broadest context. In computer systems alphabets are encoded by representing text elements in terms of sequences of characters and/or units of textual information. The characters are in turn represented within a computer in binary numbers. The system for converting characters into binary data is a character set encoding, character encoding or character encoding scheme.

The American Standard Code for Information Interchange, ASCII, is an example of a standard character encoding wherein letters, numerical digits punctuation marks etc. are represented. Each character, i.e. each data symbol, has its own unique number by which it can be indicated. As such, each data symbol has a predetermined, fixed position within this code scheme. ASCII is merely an example of a character encoding scheme, other encoding scheme such as extended ASCII, Unicode Transformation Format, UTF can also be used for indication of the data symbols according to a fixed unique number representation, as long as the positions for the data symbols within the alphabet, e.g. the code scheme, are known.

According to FIG. 1, there are 256 different code representations of data symbols, e.g. from 0-255. Depending on the code scheme they can represent different characters. If for example the ASCII code scheme is used, decimal code 97 represents character "a". As such, if the computer performing the finite automata processes the data stream en reads a character "a" as current data symbol on the input data stream, the decimal representation thereof is 97, e.g. the $97^{th}$ position within the alphabet, according to the ASCII code scheme. All possible data symbols represent unique positions within the code scheme and as such within the alphabet and can be sorted according thereto.

Figure 2:
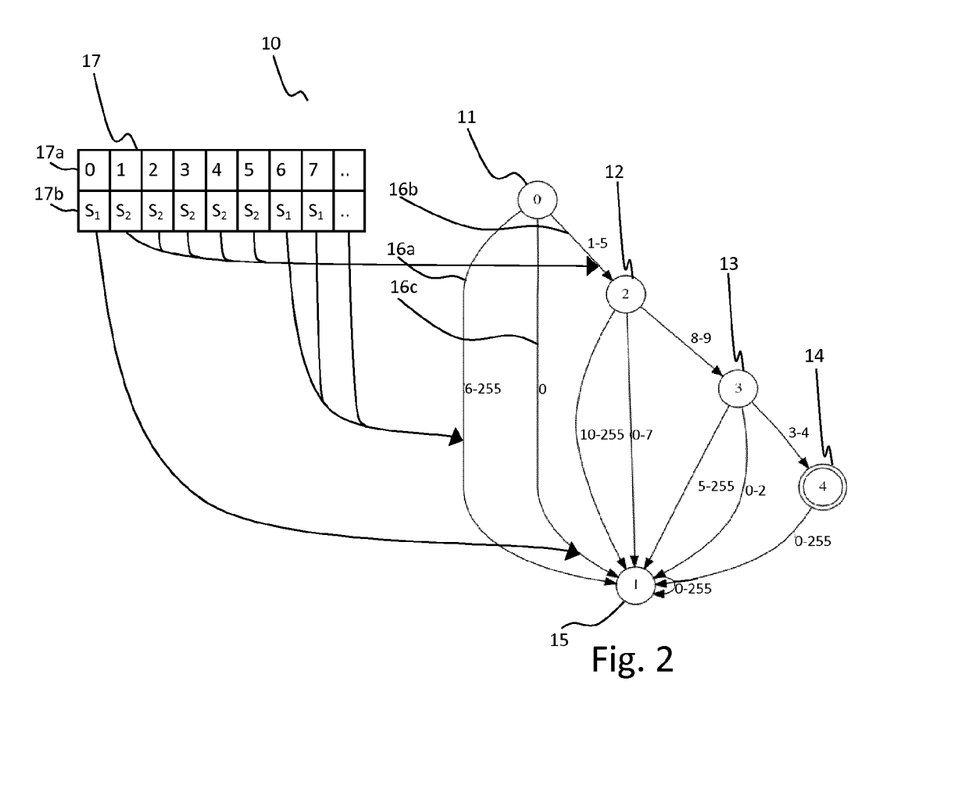
FIG. 2 illustrates the simplified finite automata further comprising a state transition register.

In FIG. 2 the state diagram 10 is disclosed of FIG. 1, however with a corresponding state transition table 17. The state transition table can be considered a truth table like manner of storing information on what state transitions are to be triggered upon inputting certain data symbols into the current, initial state. The simplified state transition table 17 disclosed in this figure comprises two rows 17a, 17b. The first row 17a comprises all data symbols of an alphabet, e.g. the finite set of 256 data symbols comprised in the extended ASCII table represented by their decimal number representation. Then for every data symbol in the second row 17b a corresponding state is presented. This is the state to which a state transition is triggered if the corresponding data symbol is the data symbol of the date stream. As such, for every state such information is comprised in the state transition table.

Plural state transition tables exist, e.g. one-, and two-dimensional state tables. The state transition table(s) are comprised in a memory of a computer executing a finite automata in the form of a state transition register. As such, a state transition register according to the invention can for example be defined as a state transition table 17 disclosed in FIG. 2.

Even a simple regular expression requires a relative large amount of storage since the state transition register holds state transitions for each possible state and data symbol of the processed data stream. For certain application a large amount of regular expressions need to be processed and as such, the memory footprint for finite automata (state transition registers) is high. In order to lower the memory footprint and to be able to process a finite automata with a non-limited amount of memory, state transition register compression is advantageous.

The visual artifice used to present the finite automata of FIGS. 1 and 2 can also be adapted to compress real state transition registers. A distinction can be made between the state transitions that are presented as state transitions for a single character code and state transitions for a range of character codes. For example the state transition 16c in FIGS. 1 and 2 is a single state transition. The state transitions 16a and 16b of FIGS. 1 and 2 are ranged state transitions which represent 250 (16a) and respectively 5 (16b) different characters.

In a first aspect of the invention such a distinction between the single and grouped or ranged transitions is implemented. For every representation of a ranged state transition, a data storage reduction, and as such memory footprint reduction is obtained. The implementation of ranged state transitions for deterministic finite automata is slightly different from standard automata theory, since standard automata theory prescribes storage of all single transitions.

Ranged state transitions represent state transitions going to a same destination state as a unique ranged transition. For converting state transitions into ranged state transitions within the state transition register an already computed deterministic finite automata can be used. Therein all states of the deterministic finite automata are iterated. For each state an array is provided with a unique position for all data symbols present in the input alphabet. For every data symbol in the alphabet a ranged transition is created if the subsequent data symbol of the alphabet, i.e. the next character according to the character code table, goes to the same destination state of the deterministic finite automata. Then only the ranges of states in stead of the individual states are stored in the register and therewith a size reduction is obtained, resulting in a lower memory footprint.

Using a compressed state transition register is, in comparison with a state transition register according to formal implementation of automata theory, slightly different. According to the use of a compressed state transition register a first step therein is to determine whether a data symbol of the input data stream is comprised in a ranged transition or within a single transition within the register. Within the compressed state transition register the computer determines whether the data symbol, i.e. the character code belongs to a range in stead of a single character transition.

The ranges can be determined in a plurality of manners. For example, each range can comprise an initial character code representation, i.e. code 41, and a final character code representation, i.e. code 48 describing the range of the character codes represented thereby. The computer can determine whether an input data symbol is comprised in the range by sequentially parsing the data symbols 17a within the state transition register 17. If the current and past character code being processed are non succeeding and the input data symbol is comprised therein, a hit occurs and the corresponding state 17b can be read to initialize, e.g. trigger a transition thereto. Further, ranges can also be determined by definition of a start character code representation only. From the subsequent character code it can be determined whether a single data symbols is being stored in the state transition table or a range.

Figure 3:
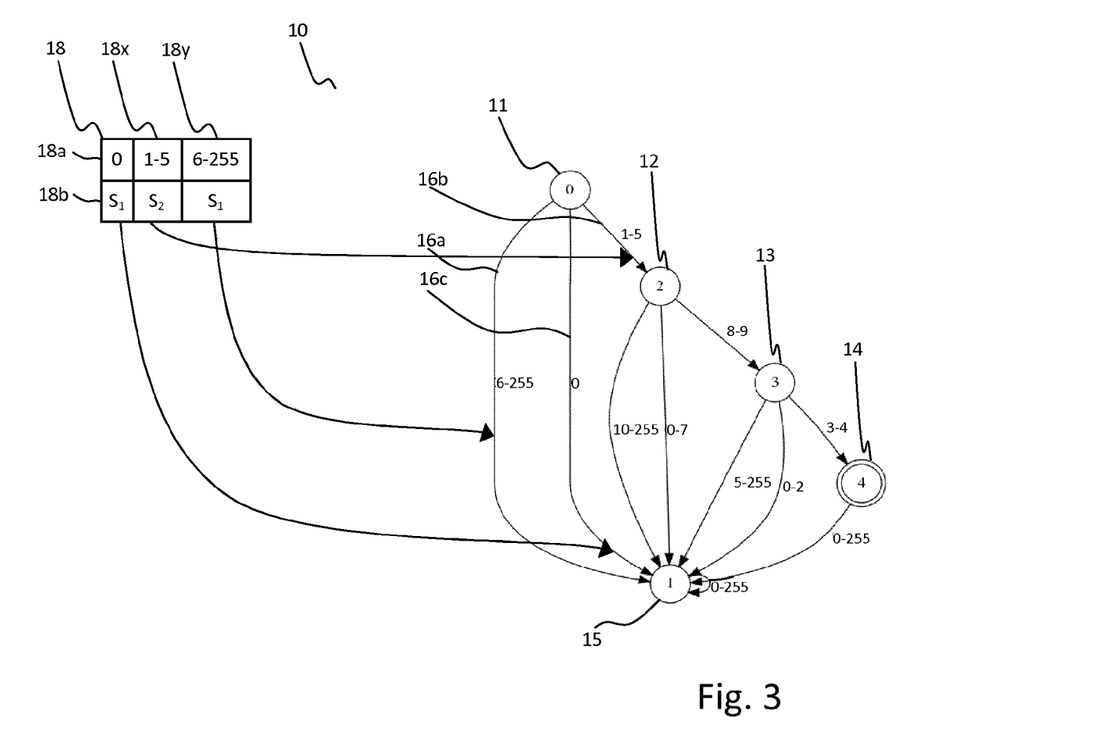
FIG. 3 illustrates the simplified finite automata further comprising a ranged/compressed state transition register.

FIG. 3 displays such a compressed, e.g. ranged, state transition table wherein for the corresponding state diagram 10 state transitions from a certain state to a same destination state triggered by succeeding character code positions within the alphabet are represented as ranges 18x, 18y.

For the initial zero state 11, 256 state transitions are possible according to the 256 possible data symbols, i.e. the decimal representation of the ASCII character codes. From the diagram it is clear that these 256 transitions only result in a transition to destination state one 12 or two 15. As such, all data symbols can be grouped according to these states. However, to determine which data symbol belongs to which group, the whole register needs to be iteratively parsed. By sorting the data symbols in the register according to a relative position within an alphabet such iterative parsing can be skipped. The data symbols 18a of the register 18 can be sequentially parsed giving a direct addressing of the state to which the transition is to be triggered.

Figure 4:
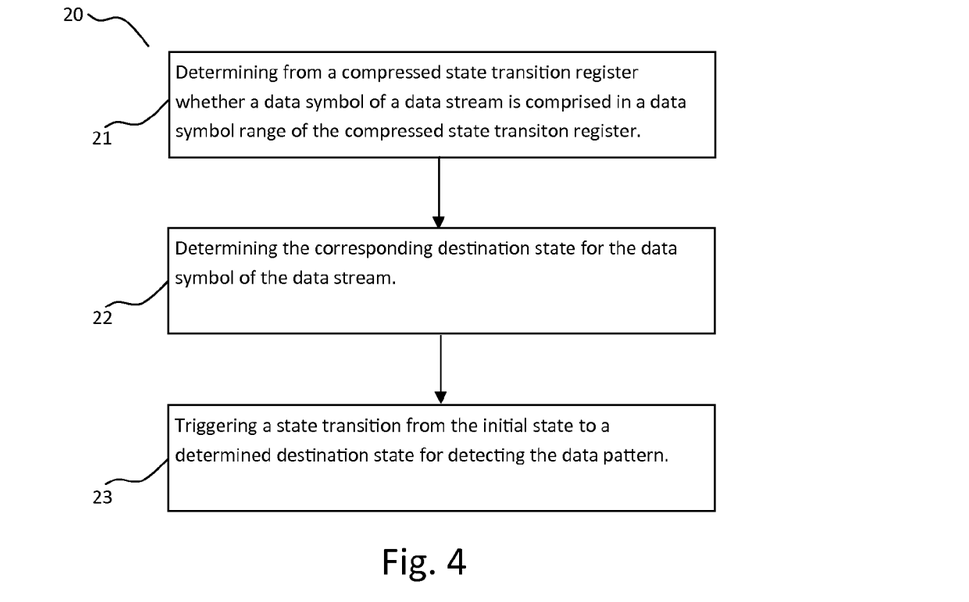
FIG. 4 illustrates a flow chart according to an aspect of the invention.

In FIG. 4 method steps are described to use a compressed state transition register, i.e. a state transition register that is being updated to comprise the ranged state transitions for subsequent data symbols triggering a transition to the same destination state. Therein the first step 21 is to determine from the updated or compressed state register whether a data symbol of the input data stream is comprised in a data symbol range of the register.

In the second step 22 the computer determines de corresponding destination state to which the finite automata triggers a transition. This destination state corresponds with the data symbol or data symbol range determined in the previous step 21.

In the final step 23 the finite automata triggers the transition to the destination state determined in step 22. As such, the computer processed a data symbol of the data stream and continues its processing with the next data symbol of the stream, starting the methods step 21-23 again.

Figure 5:
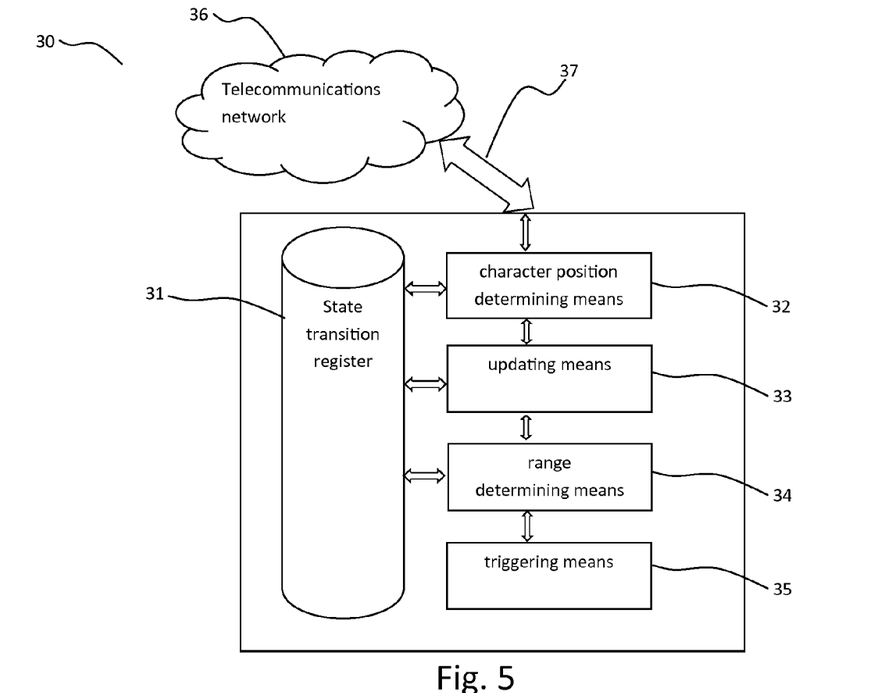
FIG. 5 illustrates a network server according to a further aspect of the invention.

FIG. 5 is a simplified representation of a computer 30 for executing a computer controlled method according to the present invention. The computer can comprise further units, like a central processing unit, not disclosed in FIG. 5, but present in a computer, or more particular a network server or node in a telecommunications network for normal operation.

The computer 30 comprises a state transition register 31 wherein the state transitions for all states of the finite automata are stored. The computer is connected with a telecommunications network 36 by link 37. The telecommunications network 36 can be any network wherein data is transmitted between parties, nodes or combinations thereof. Within the network 36, and in particular over the network connection 37 data streams are transferred. These data streams are processed by the computer 30 executing a finite automata. The computer thereto comprises character position determining means 32. Herewith the data symbols of the data stream 37 are processed and analysed. Each data symbol is represented by a character which character represents a character code within an alphabet, according to a character encoding scheme. The data symbol processed at a certain moment on the data stream can for example be represented by the character "a". The computer 30 and in particular the character position determining means 32 comprise which character code scheme is used, e.g. which alphabet applies. If for example the ASCII character encoding scheme is used, the character position determining means 32 can compare the data symbol of the data stream 37 with the ASCII code table and determine its position, i.e. decimal position 97 for character "a".

The updating means 33 of the computer 30 are arranged to read the state transition table and, according to the encoding scheme of the character position determining means 32 determine the positions of the data symbols comprised in the register. For data symbols that have subsequent positions according to the encoding scheme, i.e. "a"-"e" since their ASCII codes are 97-101, and for which the corresponding destination state is the same, the updating means 33 are arranged to update the state transition register 31 to comprise ranges of codes in stead of single data symbols. The original data symbols can be removed from the register, thereby decreasing the amount of information stored therein, and as such lowering memory footprint.

The range determining means 34 are arranged to determine, upon executing the finite automata, if a data symbol of the data stream 37 is comprised in the state transition register within a range or not. If the state transition register is only comprised by single data symbols the computer can simply parse the data symbols sequentially to compare then with the input data stream. The range determining means 34 inform the triggering means 35 to which corresponding destination state a transition should be triggered. The triggering means then execute this transition. Then the computer 30 can continue to process the next data symbol of the data stream.

The computer 30 shown in FIG. 5 comprises several units. These units each have its own unique task. However, according to an aspect, a computer 30 can also comprise only a few of these units 32, 33, 34, 35. For example only units 32 and 33 to update a state transition register 31 to an updated state transition register comprising ranged transitions. The computer 30 can also comprise units 34 and 35 for executing a finite automata with a compressed state transition register, without updating a conventional state transition register to a compressed register.

Figure 6:
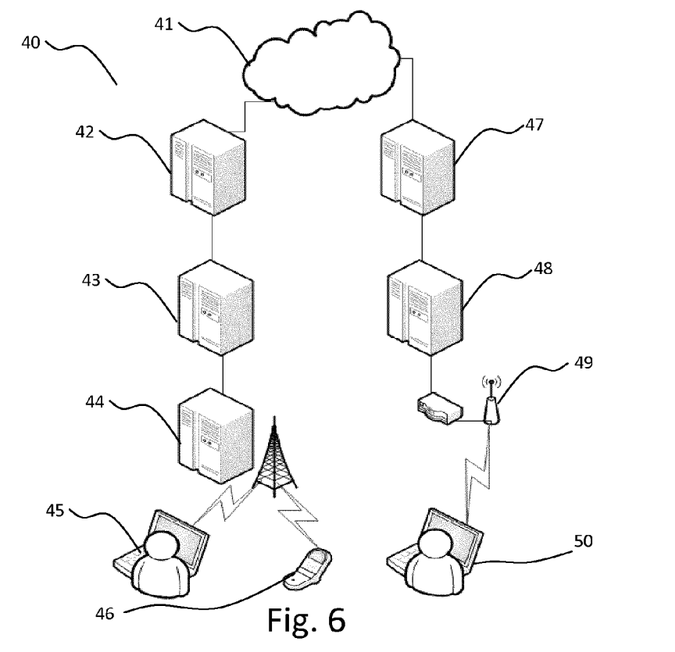
FIG. 6 illustrates a telecommunication network according to another aspect of the invention.

FIG. 6 shows a plurality of network servers or nodes 42, 43, 44, 47, 48 in a telecommunications network 40. Each network server is arranged and specifically capable of performing a certain task within the network. An example thereof is the gateway General Packet Radio Service, GPRS, Support Node, GGSN, denoted with reference number 42. The GGSN is a gateway responsible for connecting and routing data streams of a GPRS network with an external network such as the internet 41. The GGSN, in its function as a gateway, passes-through data stream. For the data packets comprised in the data stream the GGSN is at least aware of the destination, however most often not of the actual payload comprised in the packets.

For performing payload dependent processing, a network server such as a GGSN can be equipped with the units according to the computer 30 illustrated in FIG. 5. As such, the network server is arranged, if arranged to comprise a state transition register, to execute a finite automata with reduced memory footprint.

FIG. 6 further shows several other network servers such as a Server GPRS Support Node, SGSN, 43 arranged to deliver data packets from and to mobile stations within a certain area, and a Digital Subscriber Line Access Multiplexer, DSLAM, 48 that aggregates the data of a certain amount of Digital Subscriber Line, DSL modems to further transport them over a single network link, a Radio Base Station 43, RBS, or a Broadband Remote Access Server, 47 BRAS. Each of these servers, enabling communication between terminals 45, 46, 50 can be arranged to perform the method according to an aspect of the invention by at least comprising units illustrated in FIG. 5. The network servers shown in FIG. 6 are however only shown as an illustration. The method according to an aspect of the invention is not restricted to those network servers shown in this figure, but can be performed in a plurality of network servers.

The invention claimed is:

1. A network server configured for operation in a telecommunication network, and further configured for detecting occurrences of a defined sequence of data symbols in a data stream flowing within the telecommunication network, the data stream comprising a plurality of data symbols representing characters of an alphabet, said network server comprising:
an interface configured to receive the data stream; and
a computer processor configured to:
provide successive data symbols from the data stream as input data symbols to a deterministic finite automata that is implemented via the computer processor and configured to drive to one or more accepting states responsive to receiving the defined sequence of data symbols and otherwise to drive to one or more non-accepting states, wherein each input data symbol triggers the deterministic finite automata to transition from a current state to a next state in dependence on which character in the alphabet the input data symbol represents; and
reduce an amount of memory required to implement the deterministic finite automata by implementing the deterministic finite automata using a compressed state transition register, wherein, for each defined state in the deterministic finite automata, the compressed state transition register includes register entries that define the next state to be transitioned to from a current state, in dependence on which character is represented by the current input data symbol, and wherein at least one register entry is a ranged entry that spans a range of characters in the alphabet that, for the current state, all map to a same next state.

2. The network server according to claim 1, wherein said alphabet comprises an ASCII or extended ASCII alphabet.

3. The network server according to claim 1, wherein said computer processor is configured to finalize said detection of said defined sequence of data symbols upon a state transition being triggered to an accepting state of said deterministic finite automata.

4. The network server according to claim 1, wherein said computer processor is configured to process the data stream in dependence on whether the defined data symbol sequence occurs within the data stream.

5. A method of detecting occurrences of a defined sequence of data symbols in a data stream flowing within a telecommunication network, the data stream comprising a plurality of data symbols representing characters of an alphabet, said method performed by a network server in the telecommunication network and comprising:
receiving the data stream at the network server;
providing successive data symbols from the data stream as input data symbols to a deterministic finite automata that is implemented by a computer processor of the network server and configured to drive to one or more accepting states responsive to receiving the defined sequence of data symbols and otherwise to drive to one or more non-accepting states, wherein each input data symbol triggers the deterministic finite automata to transition from a current state to a next state in dependence on which character in the alphabet the input data symbol represents; and
reducing an amount of memory required to implement the deterministic finite automata by implementing the deterministic finite automata using a compressed state transition register, wherein, for each defined state in the deterministic finite automata, the compressed state transition register includes register entries that define the next state to be transitioned to from a current state, in dependence on which character is represented by the current input data symbol, and wherein at least one register entry is a ranged entry that spans a range of characters in the alphabet that, for the current state, all map to a same next state.

6. The method according to claim 5, further comprising forming the compressed state transition register by, for at least one of the defined states of the deterministic finite automata, sorting all possible data symbols according to their respective character positions in the alphabet and creating at least one ranged entry spanning a contiguous range of characters that all trigger a transition to a same next state, such that the state transition for all data symbols corresponding to the contiguous range of characters is represented by one entry in the compressed state transition register.

7. The method according to claim 5, wherein said alphabet comprises an ASCII or extended ASCII alphabet.

8. The method according to claim 5, further comprising finalizing the detection of said defined sequence of data symbols upon a state transition being triggered to an accepting state of said deterministic finite automata.

9. The method according to claim 5, further comprising processing the data stream in dependence on whether the defined data symbol sequence occurs within the data stream.

10. A non-transitory computer readable medium storing a computer program for detecting a defined sequence of data symbols in a data stream in a telecommunication network, the data stream comprising a plurality of data symbols representing characters of an alphabet, and said computer program comprising program instructions that, when executed by a computer processor of a network server configured to receive the data stream in the telecommunication network, configure the network server to:
provide successive data symbols from the data stream as input data symbols to a deterministic finite automata that is implemented via the computer processor and configured to drive to one or more accepting states responsive to receiving the defined sequence of data symbols and otherwise to drive to one or more non-accepting states, wherein each input data symbol triggers the deterministic finite automata to transition from a current state to a next state in dependence on which character in the alphabet the input data symbol represents; and
reduce an amount of memory required to implement the deterministic finite automata by implementing the deterministic finite automata using a compressed state transition register, wherein, for each defined state in the deterministic finite automata, the compressed state transition register includes register entries that define the next state to be transitioned to from a current state, in dependence on which character is represented by the current input data symbol, and wherein at least one register entry is a ranged entry that spans a range of characters in the alphabet that, for the current state, all map to a same next state.

\* \* \* \* \*